INVENTOR
Giovanni Risso

United States Patent Office 3,425,679
Patented Feb. 4, 1969

3,425,679
PNEUMATIC TIME DELAY DEVICE
Giovanni Risso, Turin, Italy, assignor to La Telemeccanica Elettrica, Ing. Amati & Gregorini, Milan, Italy
Filed Mar. 13, 1967, Ser. No. 622,772
Claims priority, application Italy, Mar. 18, 1966, 6,134/66
U.S. Cl. 267—1  18 Claims
Int. Cl. F16f; F16d 57/00; H01h 7/03

ABSTRACT OF THE DISCLOSURE

A device for obtaining a time delay of movement of a diaphragm in a closed cavity in response to an external force acting in one direction on a spring biased control shaft connected to the diaphragm. The diaphragm divides the cavity into two chambers normally containing fluid at equal pressures so that, upon movement of the diaphragm in response to the external force, or the force exerted by the spring, the volumes of the chambers increase and decrease accordingly, causing fluid to flow in passages connecting the chambers. The passages are partially coextensive and means are provided to regulate the flow through one of the passages thus regulating the time required to complete a given cycle of movement.

BACKGROUND OF THE INVENTION (1) *Field of the invention*

The present invention relates to a pneumatic time delay device, and more particularly, to such a device adapted for use in connection with an auxiliary device, such as a microswitch, having two operations which should be spaced apart in time.

(2) *Description of the prior art*

Pneumatic time delay devices are generally known in which the delay is obtained by rapidly evacuating the air present in a chamber through a valve and then replacing it gradually through means which regulate the rate of flow thereof.

These known devices usually have a flexible diaphragm disposed between two chambers, along with suitable associated control means which, by moving rapidly from an inoperative position to another position, called the reloading position, and returning from the latter to the original position with an adjustable time delay, are able to provide a time delay between two distinct operations.

Time delay devices of this type generally have relatively complex diaphragm, and valves of complicated design which are usually costly and bulky.

The fluid in these known time delay devices usually flows in an open circuit, through a first chamber, directly connected to the outside atmosphere and through a second chamber connected to the first chamber by a valve, and then to outside atmosphere through means for adjusting the rate of flow. The air coming from outside enters the second chamber at a controlled rate of flow and from here is caused to pass to the first chamber through the valve and then to the outside.

The disadvantages of these known devices are that, with the continuous flow of the air, dust may partially obstruct the means for adjusting the rate of flow and affect the performance of the device.

In order to avoid this, recourse has already been had to a filter disposed in front of the flow adjustment means. Since this filter, however, constitutes an obstacle to the flow of the air, it reduces the pressure head which can be used for introducing the air into the second chamber and therefore makes it difficult to obtain very brief time delays. Moreover, as the filter becomes clogged it must be replaced frequently, and thus will entail disadvantages when the delay device is associated with apparatus in continuous service.

Also, in these known delay devices, the fluid may also flow in a closed circuit in which case the device is completely sealed off from the outside. In this arrangement, the first chamber is connected by suitable ducts to the means for adjusting the rate of flow, and the air evacuated from the second chamber passes to the first chamber through the valve and then returns to the second chamber again through the flow adjustment means. Since it is always the same air that is in circulation, introduction of dust is avoided. In these arrangements, however, there is the disadvantage that, as the aforesaid ducts are of considerable length as compared to their cross-section, which latter is limited by the thicknesses of the chamber walls, pressure losses are caused in the air circuit and therefore by reducing the head available between the points upstream and downstream of the flow adjustment means, again renders it difficult to obtain very brief time delays.

SUMMARY OF THE INVENTION

A principal object of the present invention is to provide a pneumatic time delay device of the closed-circuit type which eliminates all the aforesaid drawbacks and permits adjustment even in the case of very brief time delays.

Another object of the present invention is to provide a pneumatic time delay device which affords the advantage of not having valves controlled by small and delicate springs, and which permits simplicity and economy of construction since the parts thereof are obtainable by molding, pressing or casting, in addition to speed of assembly, long life and reliability of operation.

Briefly summarized, the time delay device of the present invention features the use of a diaphragm dividing a cavity into a pair of chambers, normally containing fluid at equal pressure, with spring biased control means acting on the diaphragm to move same in two directions within the cavity in response to a unidirectional external force acting on the control means. A rigid dividing member also extends across the cavity to form a portion of two partially coextensive passages through which the fluid flows to and from each of said chambers in response to the movement of the diaphragm. A one-way valve member is provided which cooperates with one of the passages and a flow regulating member cooperates with the other in order to regulate the time duration of a cycle of movement.

Reference is now made to the accompanying drawings for a better understanding of the nature and objects of the present invention, which drawings illustrate the best mode presently contemplated for carrying out the objects of the invention and its principles, and are not be construed as restrictions or limitations on its scope.

DESCRIPTION OF THE PREFERRED EMBODIMENTS

Figure 2:
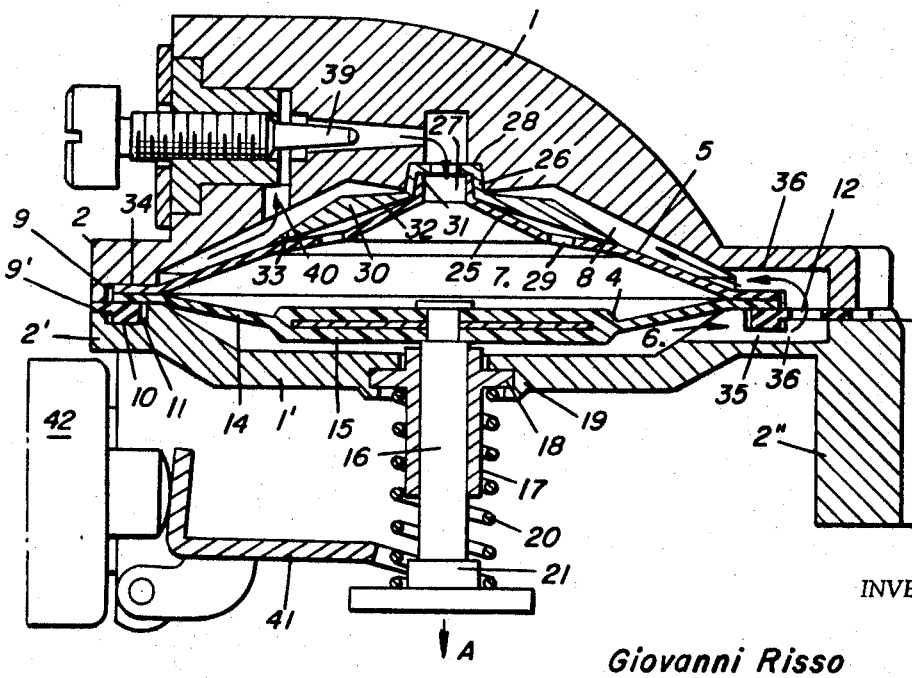
FIG. 2 is a longitudinal section taken along two intersecting mutually angled planes, their line of intersection with the plane perpendicular to them both being represented by the line A—A of FIG. 1. In this figure, the delay device has nearly completed its return to the rest position.

Referring to FIG. 2, reference numerals 1 and 1' indicate the two parts of a housing, each part having peripheral flanges 2 and 2', respectively, which are interconnected by means of screws, part 1' having another flange 2" for fixing the device to a supporting frame.

The two parts 1 and 1' may be formed as castings, are concave, and are connected with the concavities facing one another, thus forming a cavity.

A flexible diaphragm 4, which may be obtained by molding, and a rigid cup 5, which may be made of steel, and which can be obtained by stamping, divide the housing cavity into three zones, namely a first chamber 6 located between the diaphragm 4 and the first part 1' of the housing, a second chamber 7 located between the cup 5 and the diaphragm 4, and a hollow space 8 located between the cup 5 and the second part 1 of the housing.

Figure 1:
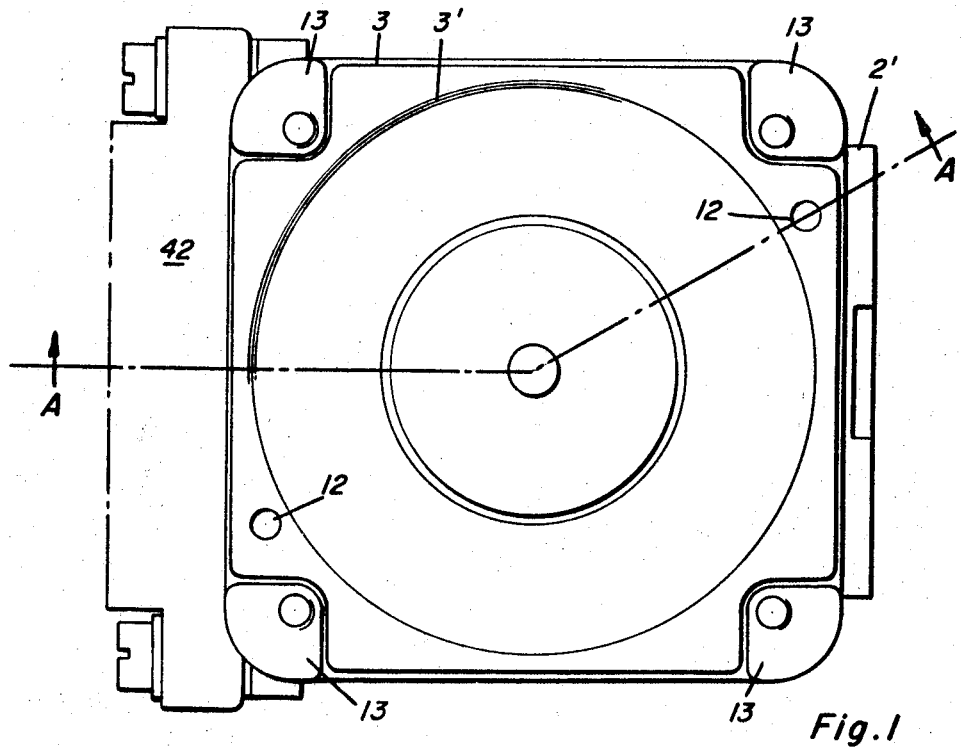
FIG. 1 is a partial plan view of the time delay device, without that part of the housing carrying the means for adjusting the rate of flow, and also without the cup and the membrane.

The diaphragm 4 may extend to cover substantially all of the area between the flanges and thus have the contour indicated by the reference 3 in FIG. 1, or it may cover only a part of the area between the flanges and thus have, for example, the contour indicated by the reference 3' in FIG. 1.

Figure 3:
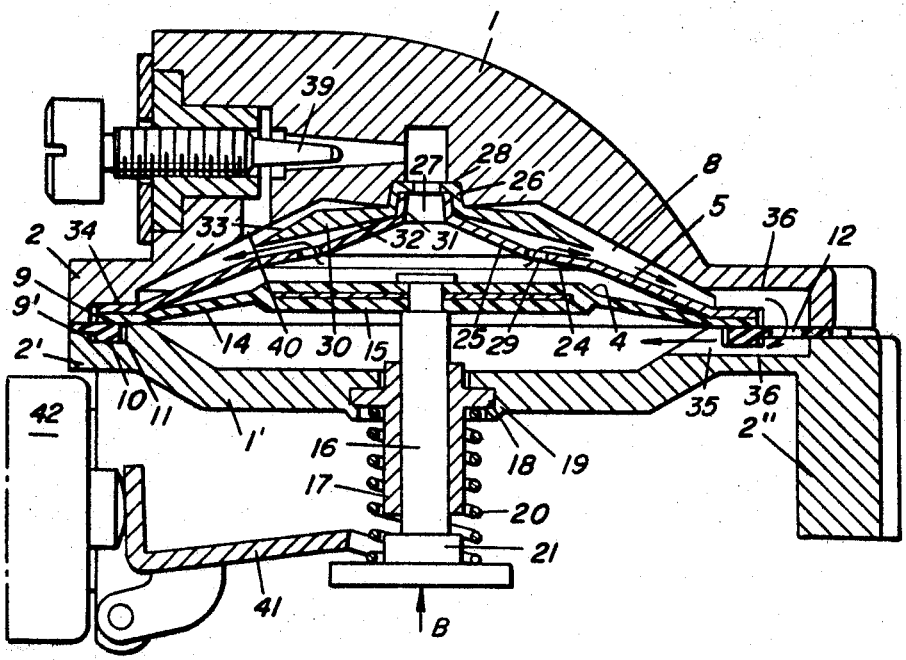
FIG. 3 is a view similar to FIG. 2, but depicting the delay device when it has almost completed the reloading stage.

In the first instance, which is that illustrated in FIGS. 2 and 3, the diaphragm is provided with a rim 9 in the zone intended to be held between the flanges 2 and 2', the rim having a thickened portion 10 which is inserted in a corresponding groove 11 formed in the flange 2', and thus which facilitates the centering of the diaphragm during the assembly stage. Rim 9 also has a lip 9' of smaller thickness which is compressed between the flanges so as to form a seal, and at least one aperture (two are indicated by the reference numeral 12 in FIG. 1) formed therethrough, the function of the aperture being explained in detail hereinafter.

As will be seen in FIG. 1, the diaphragm leaves the areas at the corners of the flanges uncovered and the flange 2' has suitable projections 13 corresponding to these areas. In this manner, when the two parts 1' and 1 of the housing are joined together, metal to metal contact between them takes place at the corners between the flanges, and the rim of the diaphragm is only partly compressed.

The portion of the diaphragm which extends inside the flanges has a flexible portion, indicated by the reference numeral 14 in FIG. 2, in the form of an annular ring adjacent the rim 9, and a central portion 15 which may include a metal disk or the like, to render this portion rigid. One end of a control shaft 16 is fixed to portion 15 of the diaphragm, which connection may be obtained, for example, by directly molding the diaphragm and the shaft together, thereby obtaining a strong and fluid-tight fixing.

The shaft 16 projects from the first part 1' of the housing through a hole formed in a bush 17, which is preferably of plastics material. The fit between the hole and the shaft is close, and the bush has such a length that fluid passing along this path encounters a resistance much greater than that which the fluid may encounter in its circuit inside the time delay device. In this manner, the shaft can be regarded in practice as projecting from the housing under fluid-tight conditions.

The bush 17 is provided with an annular projection 18 which is inserted in a suitable seat 19 formed in part 1' of the housing to effect a fluid-tight seal.

A compression spring 20 associated with the shaft is disposed between the first part 1' of the housing and the other end 21 of the shaft, which has for this purpose a suitably wider end portion. In this manner, the shaft is held in its rest or inoperative position.

As can be seen, the seat 19 projects from the outer wall of the part 1' of the housing, so that when the shaft passes rapidly into the reloading position and its end 21 strikes against the bush 17, the force of impact is dissipated over the wall of the housing through this projection.

The rigid cup 5 has its concavity facing the diaphragm and, proceeding from the outside rim towards the center, comprises a first planar peripheral portion indicated by the reference numeral 22 in FIG. 3, three successive frusto-conical portions 23, 24, 25 with different inclinations, and a cylindrical portion 26 with an axial hole 27, which is inserted in a suitable seat 28 formed in the upper portion 1 of the housing.

The intermediate frusto-conical portion of cup 5 has an inclination smaller than that of the other two portion, and has a plurality of apertures 29 extending through the cup along a circumference thereof.

Above the cup there is a bell-shaped membrane 30 of elastic material which is provided in the center with a cylindrical projection 31 having an axial aperture and which is inserted in the seat 28, and compressed therein by the action of the corresponding projection 26 of the cup. The inner surface 32 of the membrane is of frusto-conical form and has a single inclination, whereas the outer surface 33 has two separate inclinations each of which is different to that of the inner surface, so that the thickness of the membrane is at the maximum in the intermediate position and tapers steadily towards the edge and towards the center. In this manner the elasticity of the membrane is enhanced without high stresses being required in order to lift the edge thereof. The membrane can moreover easily retain the shape which is given to it in the molding operation, this shape being such that the membrane must be able, when in the inoperative position, to bear along its edge against the cup, and to cover the aperture 29 with a certain margin.

The inclination of the inner surface of the membrane is different to that of the two frusto-conical portions 24, 25 of the cup which are closest to the center, and, in any case, greater than that of the intermediate portion 24. Thus, a free space is left between the membrane and the covered surface of the cup.

Along its peripheral portion 22, the metal cup is held, together with the rim of the diaphragm, between the flanges 2 and 2' of the housing and to this end the flange 2 has a suitable recess 34. The hollow space 8 is connected to the chamber 6 through a suitable passage 35 formed in the two flanges 2 and 2' by means of radial grooves 36 extending over a certain length of the flanges, there being two such grooves in each flange in the embodiment shown in the drawings. The grooves may be of a semi-cylindrical shape, for example, and when the two flanges are united, the grooves face one another in pairs at the holes in the diaphragm and form passages for the fluid between the chamber 6 and the hollow space 8. If the rim of the diaphragm does not cover the entire area between the flanges, the two grooves are in direct contact at their outer portion. In this case, of course, it will be necessary that fluid-tightness be ensured in suitable manner between the inside and the outside, for example by means of a layer of adhesive material, so that there is neither ingress nor escape of fluid.

The second chamber 7 is connected to the hollow space 8 through a suitable circuit clearly visible in FIG. 2 and formed in the part 1 of the housing. This circuit comprises an extension 37 of the seat 28, a duct 38, which also acts as a seat for the needle of a suitable valve 39 for adjusting the rate of flow, and a vertical passage 40 connecting the pin valve to the hollow space 8.

The operation of the device will now be described while used in connection with a microswitch 42, for example, assuming a time delay between the opening and closing of the switch is desired. As seen in FIG. 3, the control shaft 16 is shown when it has almost reached the reloading position, and is moving in the direction indicated by the arrow B in response to opening of the switch and corresponding pivotal movement of lever 41. In this movement, the shaft 16 has pushed the diaphragm 4 upward so as to reduce the volume of the chamber 7.

An excess pressure is immediately created in this chamber and, being applied to the inner surface 32 of the membrane 30, lifts the edge of the latter and permits the fluid to pass through the aperture 29 in the cup 5 and, as indicated by the arrows, accumulate in the chamber 6 after passing through the hollow space 8 and the passage 35.

The lifting of the edge of the membrane is rapid because the increased pressure is exerted over the whole of the inner surface 32 of the membrane and, therefore, needs only to be of a relatively small magnitude in order to overcome the elasticity of the membrane and lift the edge thereof.

When the shaft completes its travel, which corresponds to the end of the upward movement of lever 41, the excess pressure in the chamber 7 is relieved, and the membrane, making use of its own elasticity, again assumes the normal position, closing the passage through the aperture 29.

On release of the force behind lever 41, shaft 16 is subjected to the action of the compression spring 20, which now tends to urge it outwardly.

The diaphragm 4 then produces an excess pressure in the chamber 6 and in the hollow space 8 due to the increased amount of fluid therein, this excess pressure being such that, in addition to pressing the membrane 30 against the cup, it opposes the return movement of the diaphragm under the action of spring 20.

This excess pressure then causes the fluid to re-enter the chamber 7 along the path indicated by the arrows in FIG. 2, this path comprising the passage 35, the hollow space 8, the passage 40, the ducts 38 and 37 and the axial apertures in the projection portions of the cup and the membrane. This path of flow is permitted since there are no noticeable losses of pressure, and the rate of flow may be controlled by adjustment of needle valve 39. Arrow A in FIG. 2 shows the movement of shaft 16 causing this flow, the shaft having nearly completed its return movement to the normal position.

The excess pressure in the chamber 6 is thus reduced and the time required for return of the diaphragm and shaft is a function of the controlled rate of flow effected by the needle valve. Thus, a time delay is obtained in the return of the shaft to the initial position and, through the lever 41 associated with the shaft, this delay can be utilized to space temporally the closing of the microswitch from the opening thereof.

Of course the time delay device can be used in connection with many devices other than a microswitch, such as an electromagnet having an associated armature in contact with shaft 16, etc.

I claim:

1. A pneumatic time delay device comprising a housing having an internal cavity; a diaphragm disposed in said cavity and dividing same into a first chamber and a second chamber, each normally containing fluid at equal pressures; control means connected to said diaphragm, extending externally from said cavity and adapted to move said diaphragm within said cavity in response to external forces acting on said control means, to decrease the volume of said first chamber and increase the volume of said second chamber; first passage means for the flow of fluid from said first chamber to said second chamber in response to said movement of said diaphragm; resilient means acting on said control means to effect return movement of said diaphragm into its normal position; second passage means for the flow of fluid from said second chamber to said first chamber during said return movement; said second passage means being at least partially coextensive with said first passage means; a rigid dividing member disposed in said cavity and, together with said housing, defining a hollow space immediately adjacent said first chamber, said space forming a portion of said first passage means; a one-way valve member cooperating with said rigid dividing member to effect unidirectional flow of fluid through at least a portion of said first passage means, and regulating means for regulating the flow of fluid in said second passage means, thereby regulating the duration of said return movement.

2. The device according to claim 1, wherein said space forms a portion of the coextensive portion of said first and second passage means.

3. The device according to claim 1, wherein said housing is divided into two portions having cooperating peripheral flanges, said diaphragm having its rim portion clamped between said flanges.

4. The device according to claim 3, wherein at least one pair of cooperating grooves are formed in said flanges to allow the flow of fluid therethrough.

5. The device according to claim 4, wherein said first passage means extends from said first chamber, through at least one intermediate aperture formed in said rigid dividing member, through said hollow space, through said grooves, and into said second chamber.

6. The device according to claim 5, wherein said rigid dividing member is in the form of a cup of substantially frusto-conical shape clamped peripherally between said flanges and having its concavity facing said diaphragm.

7. The device according to claim 6, wherein said cup terminates peripherally in a planar circular rim, the center of said cup having an axially apertured cylindrical projection which is inserted in a seat formed in one portion of said housing.

8. The device according to claim 7, wherein said valve member is in the form of a bell-shaped elastic membrane, normally covering the aperture in the intermediate portion of said cup, said membrane having a central portion in the form of an axially apertured cylindrical projection which extends into said seat, between said seat and said projection of said cup.

9. The device according to claim 8, wherein said membrane has an inner surface having an inclination greater than that of the corresponding surface of said cup.

10. The device according to claim 8, wherein said second passage means extends from said second chamber through said grooves, into said hollow space, and through a duct registering with said hollow space and said projections.

11. The device according to claim 10, wherein said regulating means is disposed in said duct.

12. The device according to claim 8, wherein said cup, in the direction proceeding inwardly from the rim to the center, has a first portion constituted by a planar peripheral rim, and three successive frusto-conical portions of different inclinations such that the inclination of the intermediate portion is smaller than that of the two portions adjacent to it, said intermediate aperture being located in the intermediate frusto-conical portion.

13. The device according to claim 12, wherein said membrane has an inner frusto-conical surface of inclination different to that of the two more central frusto-conical portions of said cup, and has a cross-sectional thickness which is at a maximum in an intermediate zone of the bell and which steadily tapers towards the peripheral edge and towards the center of the bell.

14. The device according to claim 1, wherein said diaphragm has a flexible annular portion adjacent its rim, and a rigid central portion to which the control means is fixed, said diaphragm extending in a continuous manner across the housing cavity and dividing said first chamber from said second chamber in a fluid-tight manner.

15. The device according to claim 3, wherein said diaphragm comprises, at its rim, a thickened portion housed in a suitable circular groove formed in at least one of said flanges.

16. The device according to claim 4, wherein the rim of the said diaphragm extends to cover substantially the whole of the area between said two flanges, at least one aperture being formed in the rim of said diaphragm between two of said grooves, so as to allow fluid flow through said grooves.

17. The device according to claim 1, wherein said control means is in the form of a shaft projecting from said second chamber through a bushing, said bushing being provided with an annular projection by means of which it is fixed to said housing so as to form a seal, and further comprising a connecting member adapted to connect the free end of said shaft to a device for applying external forces, said resilient means being in the form of a compression spring acting between the external end of said shaft and said housing.

18. The device according to claim 16, wherein said device for applying external forces is in the form of a microswitch.

References Cited

UNITED STATES PATENTS

| | | | |
|---|---|---|---|
| 2,808,881 | 10/1957 | Nadrowski et al. | 267—1 |
| 2,929,898 | 3/1960 | Schaeffer | 200—97 |
| 2,981,533 | 4/1961 | Wilson et al. | 267—1 |
| 3,040,842 | 6/1962 | Charbonneau | 188—95 |
| 3,178,524 | 4/1965 | Frisk | 200—34 |

DRAYTON E. HOFFMAN, *Primary Examiner.*

U.S. Cl. X.R.

188—94; 200—34